(12) United States Patent
Fukaya et al.

(10) Patent No.: US 7,457,078 B2
(45) Date of Patent: Nov. 25, 2008

(54) MAGNETIC DISK APPARATUS WITH REDUCED DISK FLUTTERING BY PLACING A GROOVE IN THE PERIPHERAL WALL OF THE HOUSING

(75) Inventors: Masashi Fukaya, Chiba (JP); Yoshiyuki Hirono, Kanagawa (JP); Masato Ikegawa, Ibaraki (JP); Hiroshi Mukai, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 355 days.

(21) Appl. No.: 11/223,462

(22) Filed: Sep. 9, 2005

(65) Prior Publication Data

US 2006/0056107 A1   Mar. 16, 2006

(30) Foreign Application Priority Data

Sep. 10, 2004   (JP)   ............................. 2004-263328

(51) Int. Cl.
G11B 33/14   (2006.01)
(52) U.S. Cl. .................................................. 360/97.02
(58) Field of Classification Search .............. 360/97.02, 360/97.01, 97.03, 97.04; 720/648, 651
See application file for complete search history.

(56) References Cited

U.S. PATENT DOCUMENTS

| | | | | |
|---|---|---|---|---|
| 5,212,679 A | * | 5/1993 | Tohkairin | 720/648 |
| 5,636,082 A | * | 6/1997 | Shibuya et al. | 360/97.02 |
| 5,696,649 A | * | 12/1997 | Boutaghou | 360/97.03 |
| 6,462,901 B1 | * | 10/2002 | Tadepalli | 360/97.03 |
| 6,487,038 B1 | * | 11/2002 | Izumi et al. | 360/97.02 |
| 6,728,062 B1 | * | 4/2004 | Ou-Yang et al. | 360/97.02 |
| 6,801,387 B1 | * | 10/2004 | Rahman | 360/97.03 |
| 6,961,219 B2 | * | 11/2005 | Asano et al. | 360/266 |
| 7,054,103 B2 | * | 5/2006 | Tadepalli et al. | 360/97.02 |
| 7,072,140 B2 | * | 7/2006 | Asano et al. | 360/97.02 |
| 2002/0015255 A1 | * | 2/2002 | Tadepalli et al. | 360/97.02 |
| 2002/0039252 A1 | * | 4/2002 | Tadepalli et al. | 360/97.02 |
| 2003/0107839 A1 | * | 6/2003 | Smith | 360/97.02 |
| 2003/0156351 A1 | * | 8/2003 | Voights et al. | 360/97.02 |
| 2006/0005214 A1 | * | 1/2006 | Kim et al. | 720/648 |

FOREIGN PATENT DOCUMENTS

JP   2000-322870 A   11/2000

\* cited by examiner

*Primary Examiner*—Brian E. Miller
*Assistant Examiner*—Matthew G Kayrish
(74) *Attorney, Agent, or Firm*—Townsend and Townsend and Crew LLP; Darren Gold

(57) ABSTRACT

Embodiments of the invention reduce disk fluttering while ensuring good assemblability in a magnetic disk apparatus. A magnetic disk apparatus comprises a recording disk that is an information medium configured by one or plural disks; a motor causing the recording disk to rotate; a carriage supporting a head that records information to, or plays back information from, the recording disk; a casing housing the recording disk; and a shroud disposed surrounding an outer periphery of the recording disk. A groove that extends along the recording disk is formed, vertically asymmetrical with respect to an outer peripheral surface of the recording disk, in the shroud surface at a position where a corner portion formed by the outer peripheral surface and a top surface or bottom surface of the recording disk extends in a radial direction.

17 Claims, 15 Drawing Sheets

DOTTED LINES: NO GROOVE
SOLID LINES: GROOVE

DOTTED LINES: NO GROOVE
SOLID LINES: GROOVE

DOTTED LINES: NO GROOVE
SOLID LINES: GROOVE

DOTTED LINES: NO GROOVE
SOLID LINES: GROOVE

MAGNETIC DISK APPARATUS WITH REDUCED DISK FLUTTERING BY PLACING A GROOVE IN THE PERIPHERAL WALL OF THE HOUSING

CROSS-REFERENCES TO RELATED APPLICATIONS

This application claims priority from Japanese Patent Application No. JP2004-263328, filed Sep. 10, 2004, the entire disclosure of which is incorporated herein by reference.

BACKGROUND OF THE INVENTION

The present invention relates to a magnetic disk apparatus, and in particular to a magnetic disk apparatus that includes a shroud disposed surrounding the outer periphery of a recording disk.

In a magnetic disk apparatus, an air current arises inside the casing as a result of a recording disk rotation. This air current revolves in the same direction as the recording disk in the vicinity of the surface of the recording disk, and proceeds to the outer side due to centrifugal force. Part of the current returns after it passes through a gap between the outer peripheral surface of the recording disk and the shroud surface and reaches the other side, and becomes a serpentine current in the gap by repeatedly passing through the gap. The recording disk is excited by the difference in pressure between the upper and lower surfaces of the disk arising as a result of the serpentine current, which results in the disk fluttering.

To counter this problem, JP-A-2000-322870 (Patent Document 1) discloses a structure where a protrusion is disposed across the substantial entire periphery of the shroud, and this convex portion enters the space between the recording disks. Thus, the serpentine current passing through the interval is deterred and disk fluttering is suppressed.

JP-A-2000-348465 (Patent Document 2) discloses suppressing disk fluttering by setting the distance between the outer peripheral surface of the recording disk and the shroud surface facing the outer peripheral surface of the recording disk to 0.5 mm or less, and disposing a rectifying groove along the substantial entire periphery of the shroud adjacent to the region of the shroud facing the outer peripheral surface of the recording disk.

BRIEF SUMMARY OF THE INVENTION

In recent years, the trend has been to increase the number of revolutions of the recording disk in order to shorten the disk access time. As a result, the current speed inside the casing rises, the current meandering through the gap also increases, and disk fluttering increases. Also, due to the demand to increase the recording density, there has been a demand to increase precision with respect to positioning precision. Thus, reducing disk fluttering is desired. For these reasons, reducing disk fluttering by reducing the current meandering through the gap is desired.

In Patent Document 1, the serpentine current in the gap is suppressed by the protrusion of the shroud, and in Patent Document 2, the serpentine current is suppressed by setting the gap to 0.5 mm or less and disposing the rectifying groove.

Although these methods are effective with respect to suppressing the serpentine current, the former method has the problem that the assembly process becomes complicated due to the structure where the protrusion of the shroud enters the space between the recording disks, and the latter method has the problem that high assembly precision is demanded and assembly is cumbersome because it is necessary to suppress the gap to be equal to or less than a constant width.

It is a feature of the present invention to provide a magnetic disk apparatus that can reduce disk fluttering while ensuring good assemblability.

In accordance with an aspect of the present invention, a magnetic disk apparatus comprises a recording disk that is an information medium configured by one or plural disks; a motor causing the recording disk to rotate; a carriage supporting a head that records information to, or plays back information from, the recording disk; a casing housing the recording disk; and a shroud disposed surrounding an outer periphery of the recording disk, wherein a groove that extends along the recording disk is formed, vertically asymmetrical with respect to an outer peripheral surface of the recording disk, in the shroud surface at a position where a corner portion formed by the outer peripheral surface and a top surface or bottom surface of the recording disk extends in a radial direction.

More preferable, specific configural examples of the invention are as follows.

(1) A plurality of the recording disks are vertically supported, and the groove is disposed in the shroud surface at a position where a corner portion formed by the outer peripheral surface and a surface, opposite from the side facing the casing, of the recording disk facing a bottom wall or a top wall of the casing extends in a radial direction.

(2) A plurality of the recording disks are vertically supported, and the groove is respectively disposed in the shroud surface at a position where a corner portion formed by the outer peripheral surface and a surface, opposite from the side facing the casing, of the recording disk facing a bottom wall of the casing extends in a radial direction, and the shroud surface at a position where a corner portion formed by the outer peripheral surface and a surface, opposite from the side facing the casing, of the recording disk facing a top wall of the casing extends in a radial direction.

(3) The groove is positioned so that upper and lower ends thereof correspond to the outer peripheral surface of the recording disk and the space between the recording disks.

(4) The recording disk is disposed so that the interval between the recording disk and a bottom wall of the casing and the interval between the recording disk and a top wall of the casing are different, and the groove is disposed in the shroud surface at a position where a corner portion formed by the outer peripheral surface and a surface, opposite from the side facing the casing, of the recording disk facing the casing at the narrow interval extends in a radial direction.

(5) The recording disks are configured by numerous disks disposed at equal intervals, and only one groove is disposed in the shroud surface at a position where a corner portion formed by the outer peripheral surface and a surface, opposite from the side facing the casing, of the recording disk facing the bottom wall or top wall of the casing extends in a radial direction.

(6) Part of the shroud is missing with respect to the entire periphery, and end portions of the groove at the missing position of the shroud are blocked in a peripheral direction.

Another aspect of the present invention provides a magnetic disk apparatus comprising: a recording disk that is an information medium configured by plural disks vertically; a motor causing the recording disk to rotate; a carriage supporting a head that records information to, or plays back information from, the recording disk; a casing housing the recording disk; and a shroud disposed surrounding an outer periphery of the recording disk, with part of the shroud being missing with respect to the entire periphery, wherein a groove is disposed in the shroud surface at a position where a corner portion formed by the outer peripheral surface and a top surface or bottom surface of the recording disk extends in a radial direction, the recording disk is disposed so that the interval between the recording disk and a bottom wall of the casing and the interval between the recording disk and a top wall of the casing are different, and only one groove is disposed in the shroud surface at a position where a corner portion formed by the outer peripheral surface and a surface, opposite from the side facing the casing, of the recording disk configuring the narrow interval extends in a radial direction, and the groove is disposed vertically facing part of the outer peripheral surface of the recording disk and extending facing the space between the recording disks, with end portions of the groove at the missing position of the shroud being blocked in a peripheral direction.

According to the magnetic disk apparatus of the present invention, disk fluttering can be reduced while ensuring good assemblability.

DETAILED DESCRIPTION OF THE INVENTION

Figure 1:
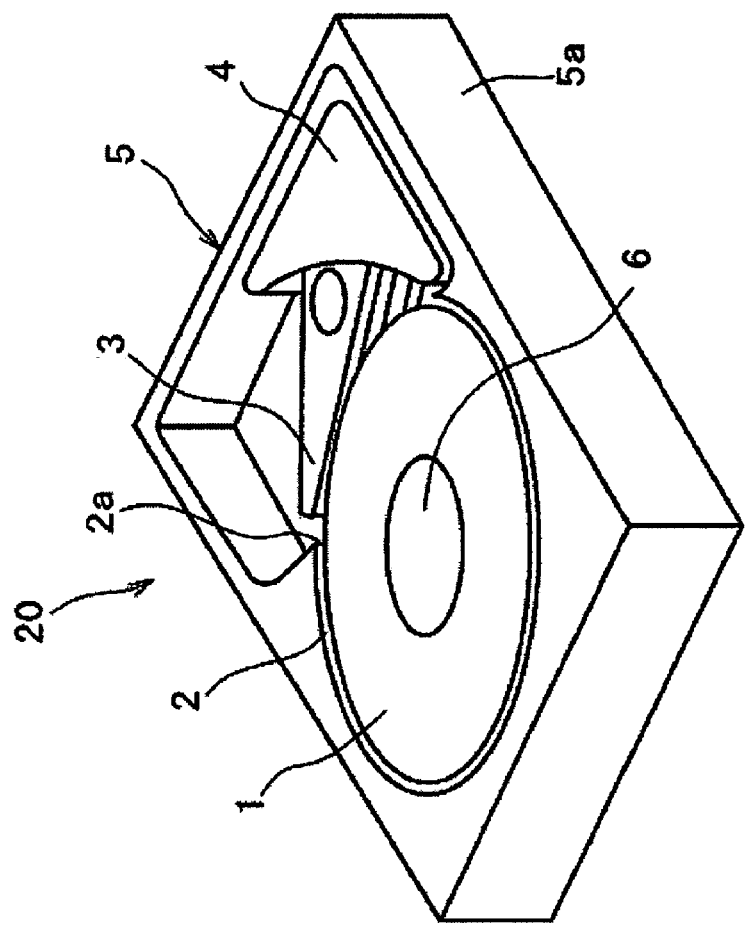
FIG. 1 is a perspective view of a magnetic disk apparatus pertaining to a first embodiment of the invention.

Embodiments of the invention will be described below using the drawings. Reference numerals that are the same in the drawings of the embodiments represent the same portions or corresponding portions. It will be noted that more effective results can be achieved by appropriately combining embodiments as necessary.

A magnetic disk apparatus of a first embodiment of the invention will be described with reference to FIGS. 1 to 8.

Figure 2A:
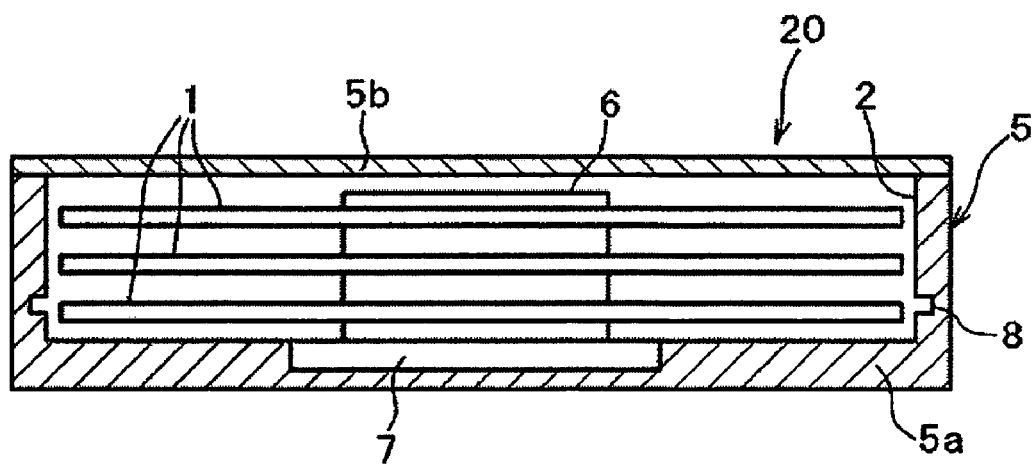
FIG. 2A is a longitudinal sectional view of the magnetic disk apparatus of FIG. 1.
Figure 2B:
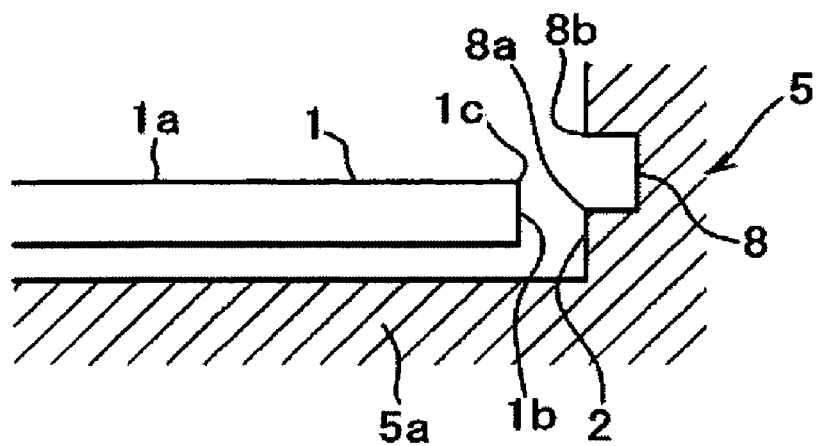
FIG. 2B is an enlarged view of relevant portions in FIG. 2A.
Figure 2C:
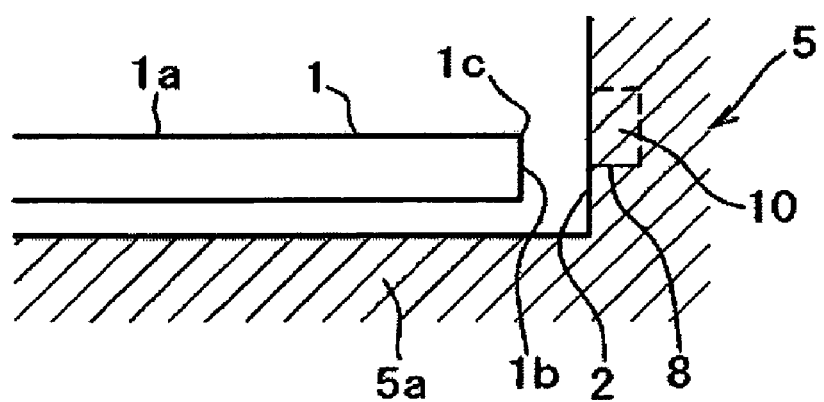
FIG. 2C is an enlarged view of relevant portions in the vicinity of a shroud missing portion in FIG. 2A.
Figure 3:
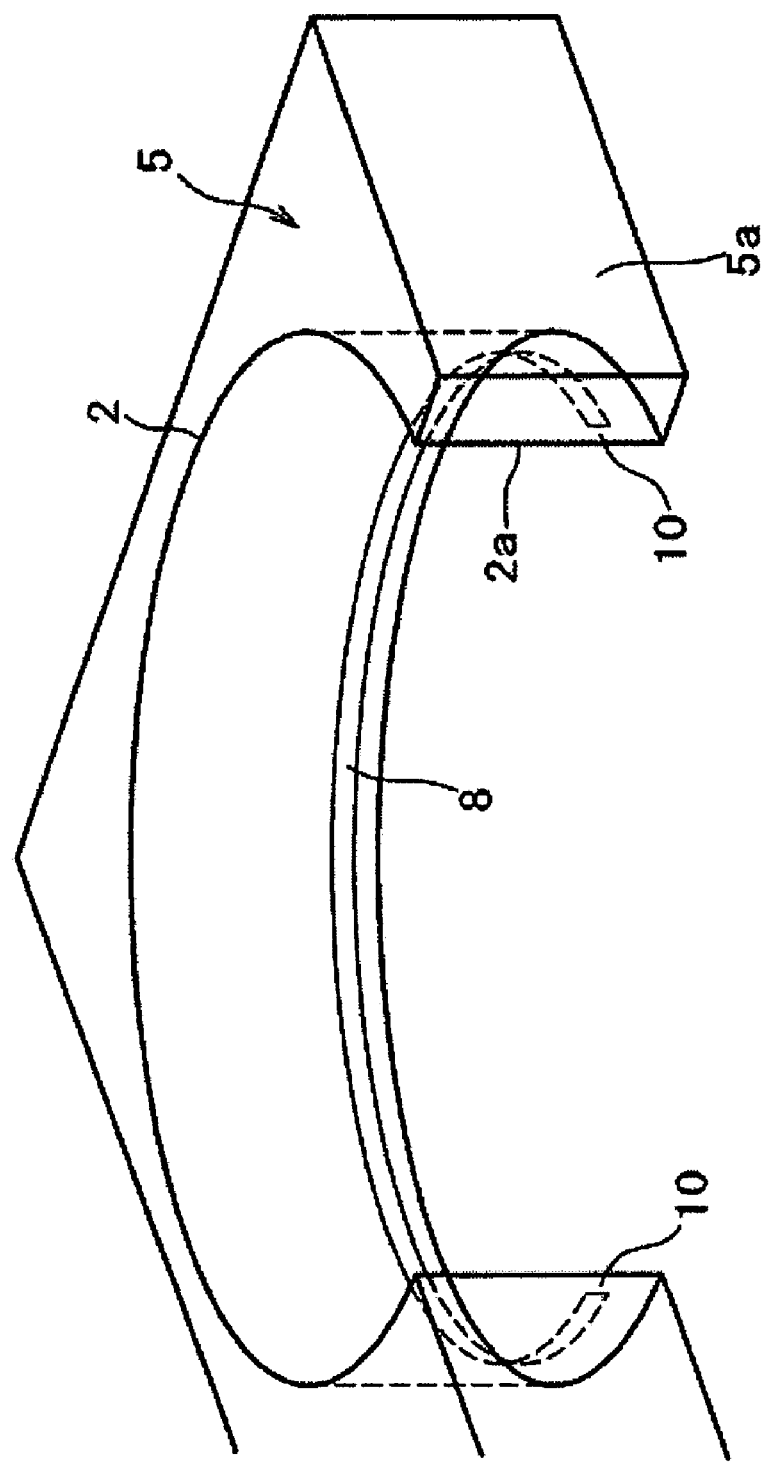
FIG. 3 is a perspective view showing part of a casing in FIG. 1.

First, the overall configuration of a magnetic disk apparatus 20 of the present embodiment will be described with reference to FIGS. 1 to 3. FIG. 1 is a perspective view of the magnetic disk apparatus 20 of the present embodiment, FIG. 2A is a longitudinal sectional view of the same magnetic disk apparatus 20, FIG. 2B is an enlarged view of relevant portions of FIG. 2A, FIG. 2C is a cross-sectional view corresponding to FIG. 2 of the vicinity of a missing portion of a shroud, and FIG. 3 is a perspective view showing part of a base 5a of FIG. 1. It will be noted that FIG. 1 shows a state where a cover 5b configuring a casing 5 has been removed. Also, a hub 6, a motor 7 and a recording disk 1 of FIG. 2 are shown in a state where they are seen from the side and not a cross-sectional state. The same is true with respect to FIG. 7, FIG. 9, FIG. 11, and FIGS. 13 to 17.

The magnetic disk apparatus 20 comprises a recording disk 1 that is an information medium; a motor 7 causing the recording disk 1 to rotate; a carriage 3 supporting a head (not shown) that records information to, or plays back information from, the recording disk 1; a casing 5 housing the recording disk 1 and the like; and a shroud 2 disposed surrounding the outer periphery of the recording disk 1.

The casing 5 is configured by the base 5a and the cover 5b, and the interior of the casing 5 is a closed space. The recording disk 1, the carriage arm 3, a head suspension 4, the hub 6, the motor 7 and the like are housed in this closed space.

The recording disk 1 is configured by a discoid member that records information with a magnetic material. Plural (three in the present embodiment, which means numerous disks) recording disks 1 are vertically supported on the hub 6, with intervals being disposed between the recording disks 1. The supported recording disks 1 are disposed on the hub 6 at equal spatial intervals. In the present invention, "plural"

means two or more, and "numerous" means three or more. In a state where the plural recording disks 1 are disposed on the hub 6, the recording disks 1 can be housed inside the casing 5 (specifically, inside the shroud 2) together with the motor 7, so that good assemblability is obtained. The recording disks 1 housed and disposed inside the shroud 2 are rotated at a high speed by the motor 7 at the time of recording/playback.

The recording disks 1 are disposed so that the interval between the bottom wall of the casing 5 configured by the base 5a and the recording disk 1 facing this bottom wall and the interval between the top wall of the casing 5 configured by the cover 5b and the recording disk 1 facing this top wall are different. In the present embodiment, the interval between the base 5a and the recording disk 1 facing the base 5a is narrower than the interval between the cover 5b and the recording disk 1 facing the cover 5b.

The shroud 2 is configured by the inner side surface of the casing 5 (specifically, the base 5a), and includes a groove 8. It will be noted that the shroud 2 may also be configured by a member that is separate from the casing 5 and fitted into the side surface of the base 5a. Part of the shroud 2 is missing with respect to the entire periphery, and an end portion of the carriage arm 3 enters and leaves the shroud 2 through this missing portion 2a.

The carriage arm 3 includes an end portion disposed with a head, and is pivotably supported to move the head in the radial direction of the recording disks 1. The head suspension 4 is for driving the carriage arm 3.

Next, the details of the groove 8 disposed in the shroud 2 will be described with reference to FIGS. 2 and 3. The groove 8 is disposed, so as to extend substantially parallel along the recording disk 1, in the shroud surface at a position where a corner portion 1c formed by a recording surface 1a and an outer peripheral surface 1b of the recording disk 1 extends in the radial direction. The corner portion 1c is formed by the surface 1a, which is opposite from the side facing the casing, and the outer peripheral surface 1b of the recording disk 1 facing the bottom wall of the casing 5.

Additionally, the groove 8 is formed along the substantial entire periphery of the surface of the shroud 2, and formed so as to be vertically asymmetrical with respect to the recording disk 1. The shape of the groove 8 is quadrangular in longitudinal cross section. A lower end 8a of the groove 8 is positioned so as to correspond to the center portion of the outer peripheral surface 1b of the recording disk 1, and an upper end 8b of the groove is positioned so as to correspond to the space between the recording disks 1. In other words, the groove 8 is positioned so as to correspond to and straddle the outer peripheral surface 1b of the recording disk 1 and the space between the recording disks 1, and positioned so as to not correspond to the space at the opposite side of the recording disk 1. Moreover, as shown in FIGS. 2C and 3, groove blocking portions 10 are formed so as to block, in the peripheral direction, the end portions of the groove 8 at the missing position of the shroud. The groove blocking portions 10 are formed integrally with the base 5a, and disposed so that they remain when the groove 8 is cut in the shroud surface of the base 5a.

In the present embodiment, the interval between the recording disk 1 and the bottom wall of the casing 5 is narrower than the interval between the recording disk 1 and the top wall of the casing 5. Only one groove 8 is disposed in the shroud surface at the position where the corner portion 1c formed by the surface 1a, which is opposite from the casing side facing this narrow interval, and the outer peripheral surface 1b of the recording disk 1 extends in the radial direction.

In relation to the effects of the groove 8, results obtained by current analysis will be described with reference to FIGS. 4 to 8.

Figure 4:
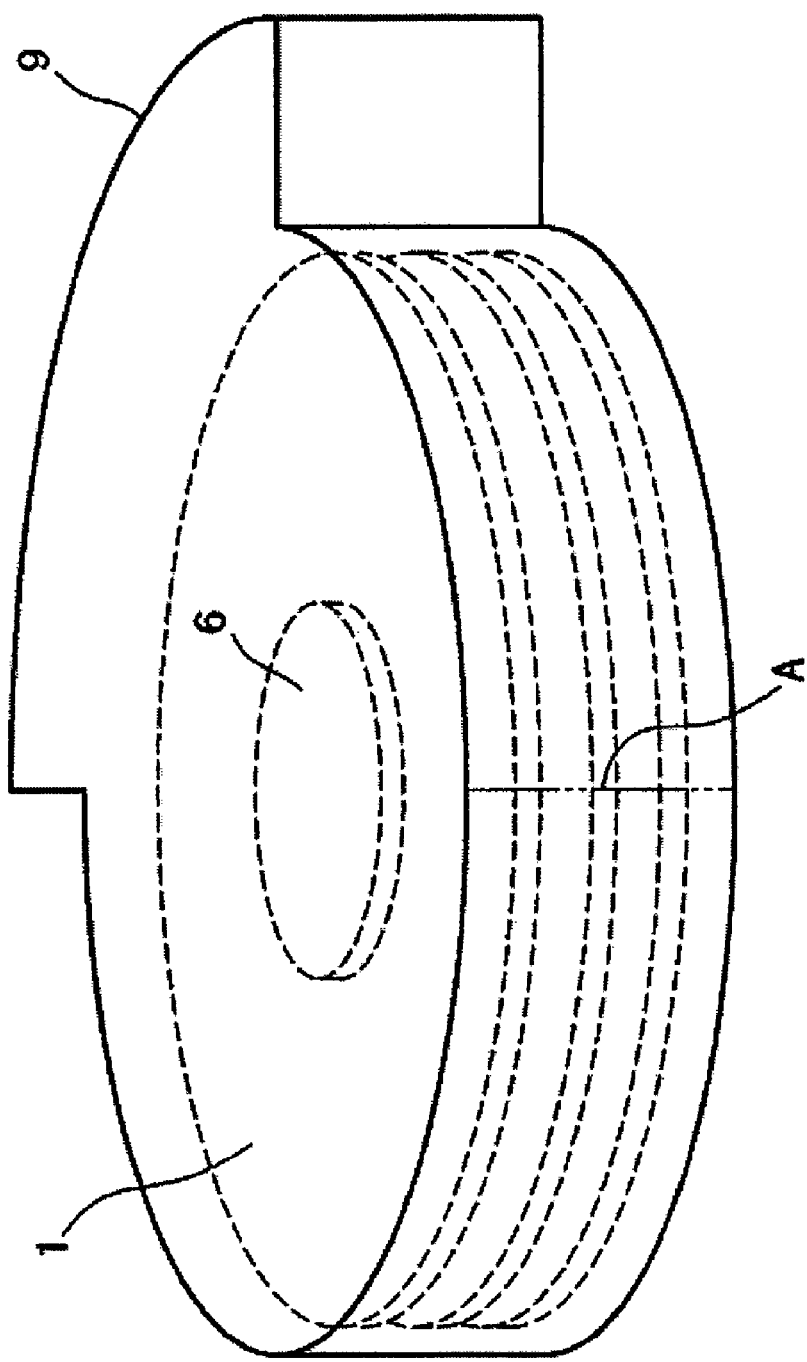
FIG. 4 is a schematic configuration of a current path used for current analysis of a shroud portion of the magnetic disk apparatus.

FIG. 4 shows the schematic shape of a current path used in order to analyze the current inside the shroud of the magnetic disk apparatus. The current path has a shape in which only the fluid portion of the magnetic disk apparatus is modeled. The current path shape is substantially cylindrical, and a dummy region 9 is added to simulate the region where the carriage arm enters and leaves the spaces between the disks. Recording disks 1 with diameters of 84 mm and the hub 6 rotate at 10,000 min-1 in this current path.

Figure 5A:
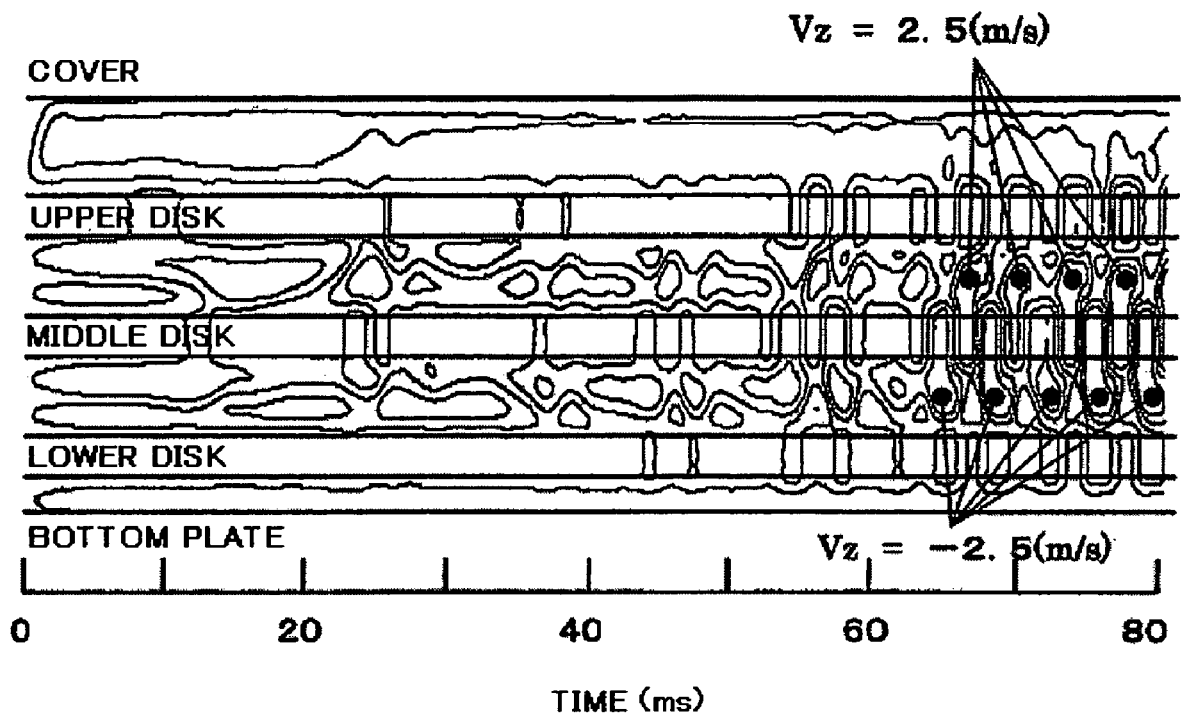
FIG. 5A is a contour diagram of current speed in the vertical direction created on the basis of an analysis result in a case not including a groove in the current path of FIG. 4.
Figure 5B:
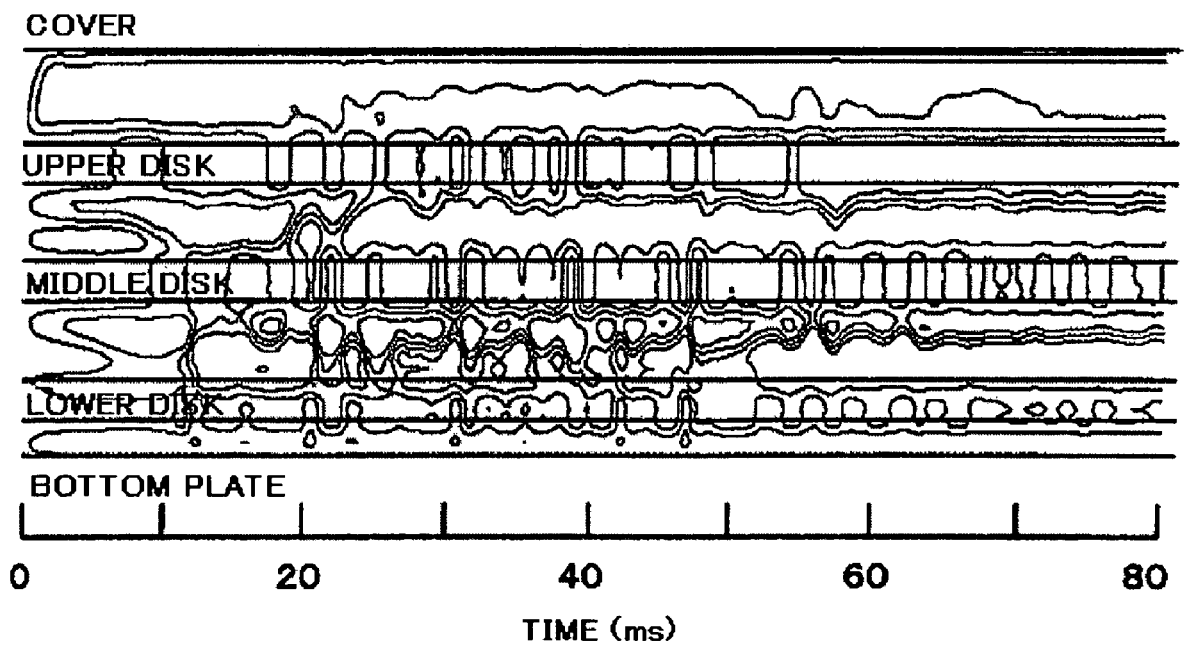
FIG. 5B is a contour diagram of current speed in the vertical direction created on the basis of an analysis result in a case including a groove in the current path of FIG. 3.

FIG. 5A is a contour diagram of the current speed in the vertical direction created on the basis of the analysis result in the case of a comparative example 1 not including a groove in the current path of FIG. 4, and FIG. 5B is a contour diagram of the current speed in the vertical direction created on the basis of the analysis result in the case of the present embodiment including a groove in the current path of FIG. 4. The position at which the current speed was evaluated was the interval between the recording disk 1 and the shroud 2 represented by A in FIG. 4. The horizontal axis in FIGS. 5A and 5B represent the time, and the vertical axis represents the position in the vertical direction. The positional relationship between the cover 5b, the bottom plate of the base 5a, and the three recording disks 1 therebetween is also shown in the contour diagrams. The evaluation was done in instances where the distance between the lowermost disk 1 and the base 5a was narrower than the distance between the cover 5b and the uppermost disk 1. The evaluation was started from the state where the fluid was stationary to obtain an analysis over 80 ms. In FIG. 5A of comparative example 1, it will be understood that a periodic flow pattern arose from around the time that 60 ms had elapsed after the start, as indicated by the marks at the places of ±2.5 m/s. Particularly in the interval between the middle disk and the shroud, a serpentine current alternately flowing from down to up and from up to down was observed, and the pressure fluctuation arising with this serpentine current was a cause of disk fluttering. In FIG. 5B of the present embodiment, it will be understood that the serpentine current virtually scarcely arises.

Figure 6:
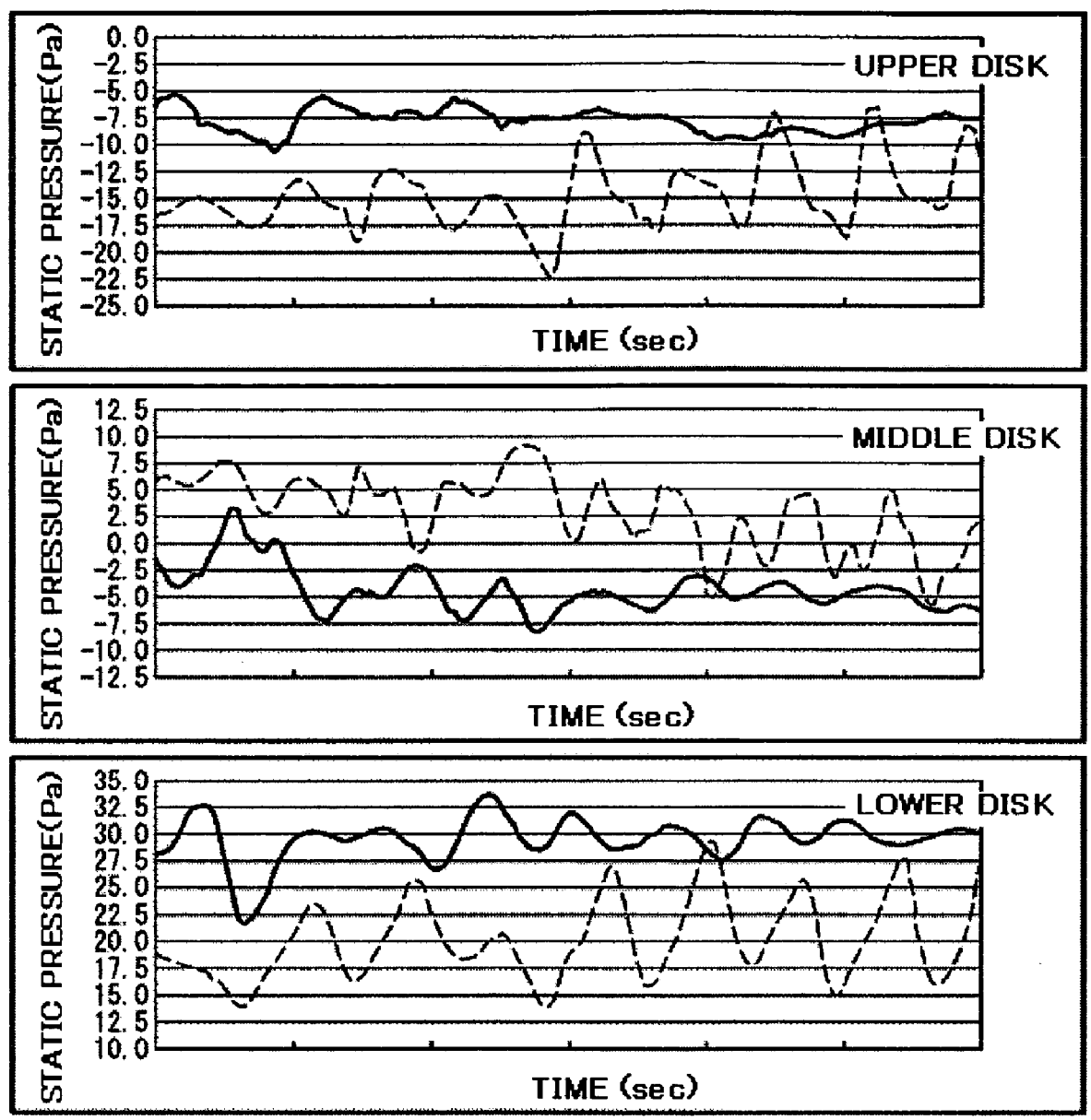
FIG. 6 is a time chart showing the difference in static pressure between top surfaces and bottom surfaces of upper, middle and lower recording disks in the vicinity of the interval A of FIG. 4.

FIG. 6 is a time chart showing the difference in static pressure between the top surfaces and the bottom surfaces of the upper, middle and lower recording disks in the vicinity of the interval A of FIG. 4. The dotted lines represent comparative example 1, where the groove 8 was not disposed in the shroud 2, and the solid lines represent the present embodiment disposed with the groove 8. As indicated in the results, it will be understood that the amplitude of the pressure fluctuation was remarkably reduced in the upper, middle and lower recording disks by the effect of the groove 8, and that there was an effect in reducing disk fluttering.

Figure 7A:
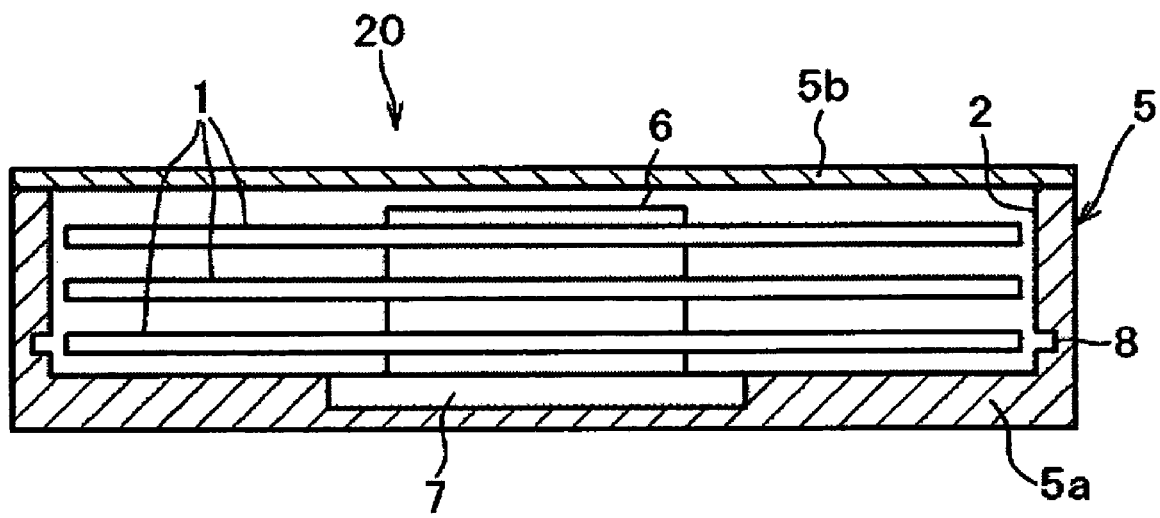
FIG. 7A is a longitudinal sectional view of a magnetic disk apparatus pertaining to a comparative example 2 where a groove is formed vertically symmetrically in a shroud corresponding to an outer peripheral surface of a recording disk.
Figure 7B:
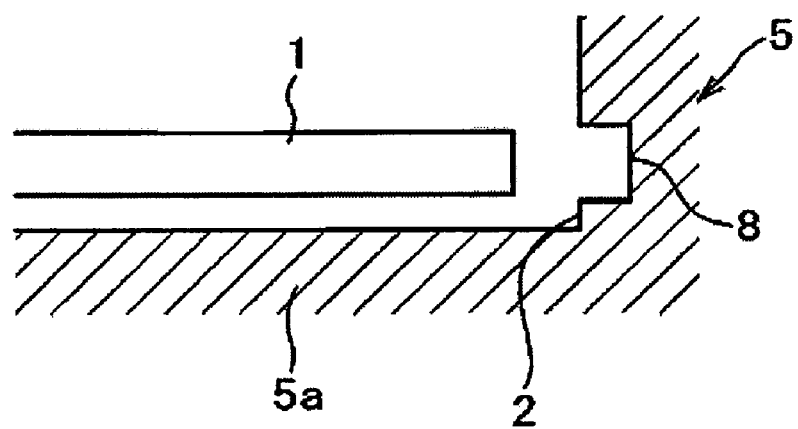
FIG. 7B is an enlarged view of relevant portions of FIG. 7A.

FIG. 7A is a longitudinal sectional view of a magnetic disk apparatus 20 that is a comparative example 2, where the groove 8 is vertically symmetrically formed in the shroud corresponding to the outer peripheral surface of the recording disk 1, and FIG. 7B is an enlarged view of relevant portions of FIG. 7A. In comparative example 2, the groove 8 is formed in the substantial entire periphery in the shroud 2 corresponding to the position of the lower disk 1. The difference with the present embodiment lies in the positional relationship between the recording disk 1 and the groove 8, as shown in the enlarged view. In comparative example 2, the vertical center of the recording disk 1 and the vertical center of the groove 8 are in the same plane, so that the positional relationship between the groove 8 and the recording disk 1 is symmetrical.

Figure 8:
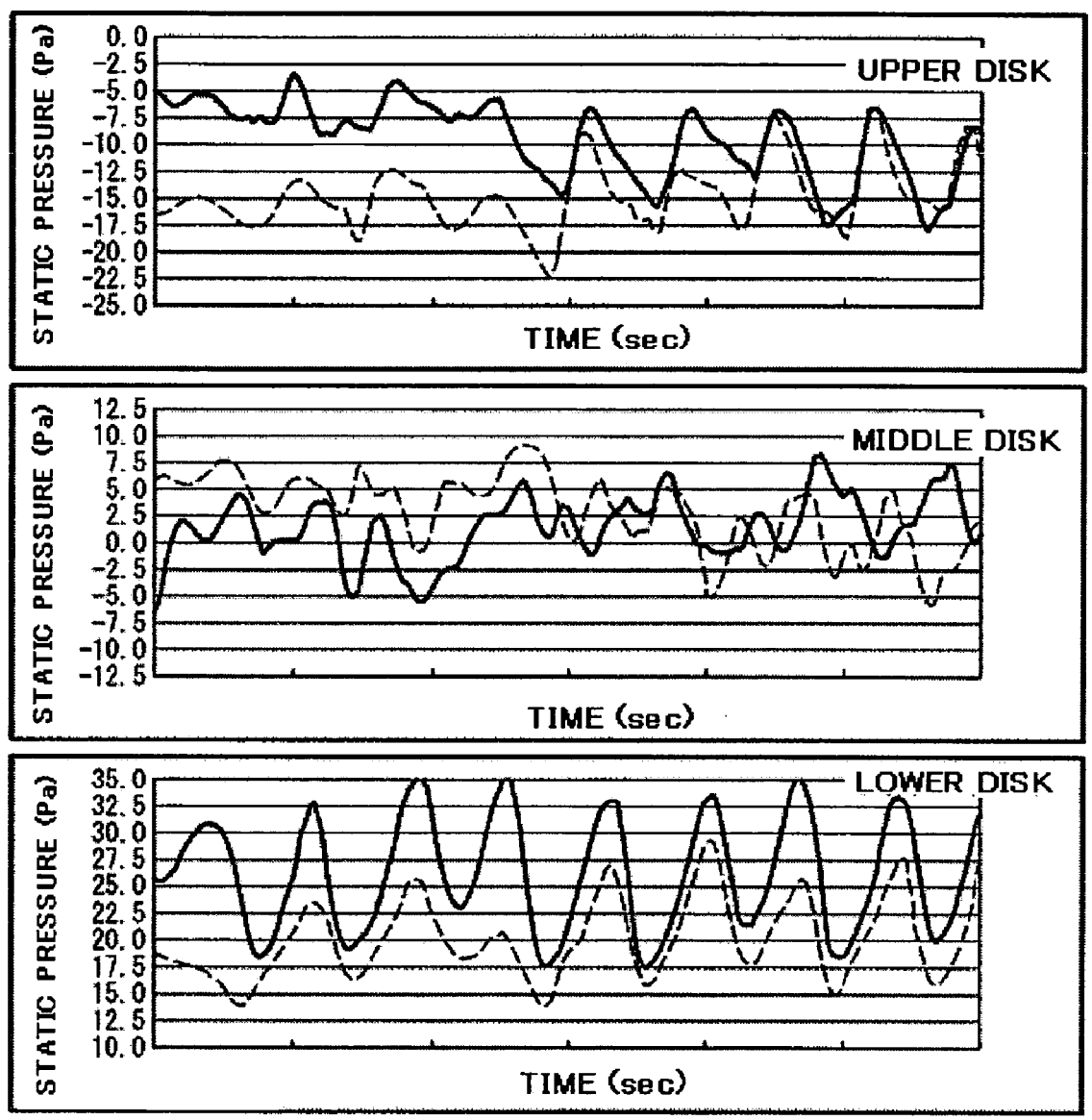
FIG. 8 is a time chart showing the difference in static pressure between top surfaces and bottom surfaces of upper, middle and lower recording disks of the magnetic disk apparatus pertaining to comparative example 2 of FIG. 7A.

FIG. 8 is a time chart showing the difference in static pressure between the top surfaces and the bottom surfaces of the upper, middle and lower recording disks of FIGS. 7A and 7B. The analysis condition and evaluation position in FIGS. 7A and 7B were the same as those in FIGS. 5A and 5B. Looking at FIGS. 7A and 7B, it will be understood that the effect of reducing the static pressure difference amplitude was not obtained with respect to the entire regions of the upper, middle and lower recording disks, and that the effect of the asymmetrical groove of the present embodiment is large.

Next, a second embodiment of the invention will be described using FIGS. 9 and 10. The second embodiment is different from the first embodiment in the following point, and basically the same as the first embodiment in other points.

Figure 9:
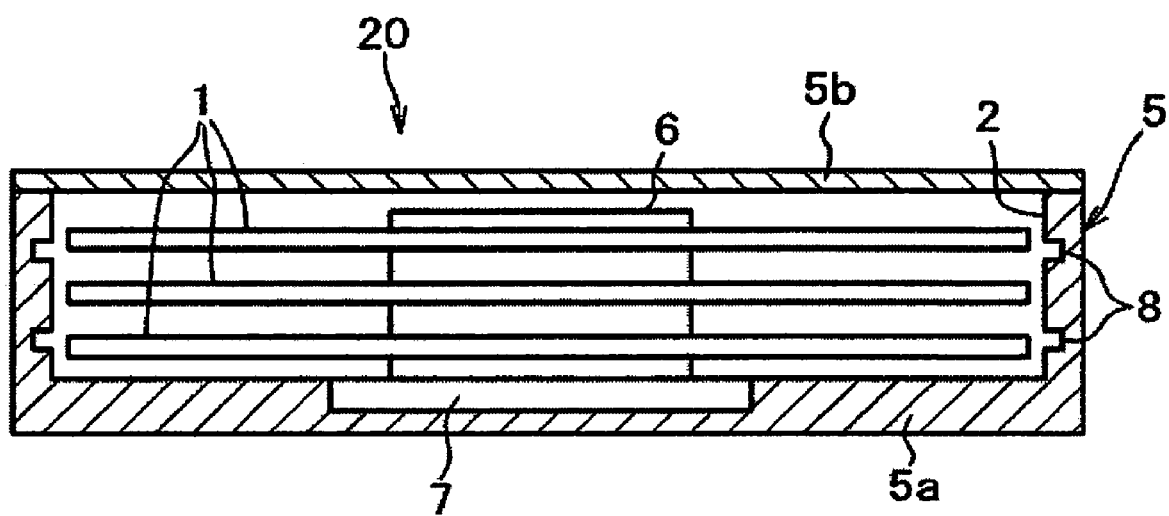
FIG. 9 is a longitudinal sectional view of a magnetic disk apparatus pertaining to a second embodiment of the invention.

FIG. 9 is a longitudinal sectional view of the magnetic disk apparatus pertaining to the second embodiment of the invention. The characteristic of the second embodiment is that there are two grooves 8; an asymmetrical groove 8 with respect to the undersurface of the upper disk 1 is added.

Figure 10:
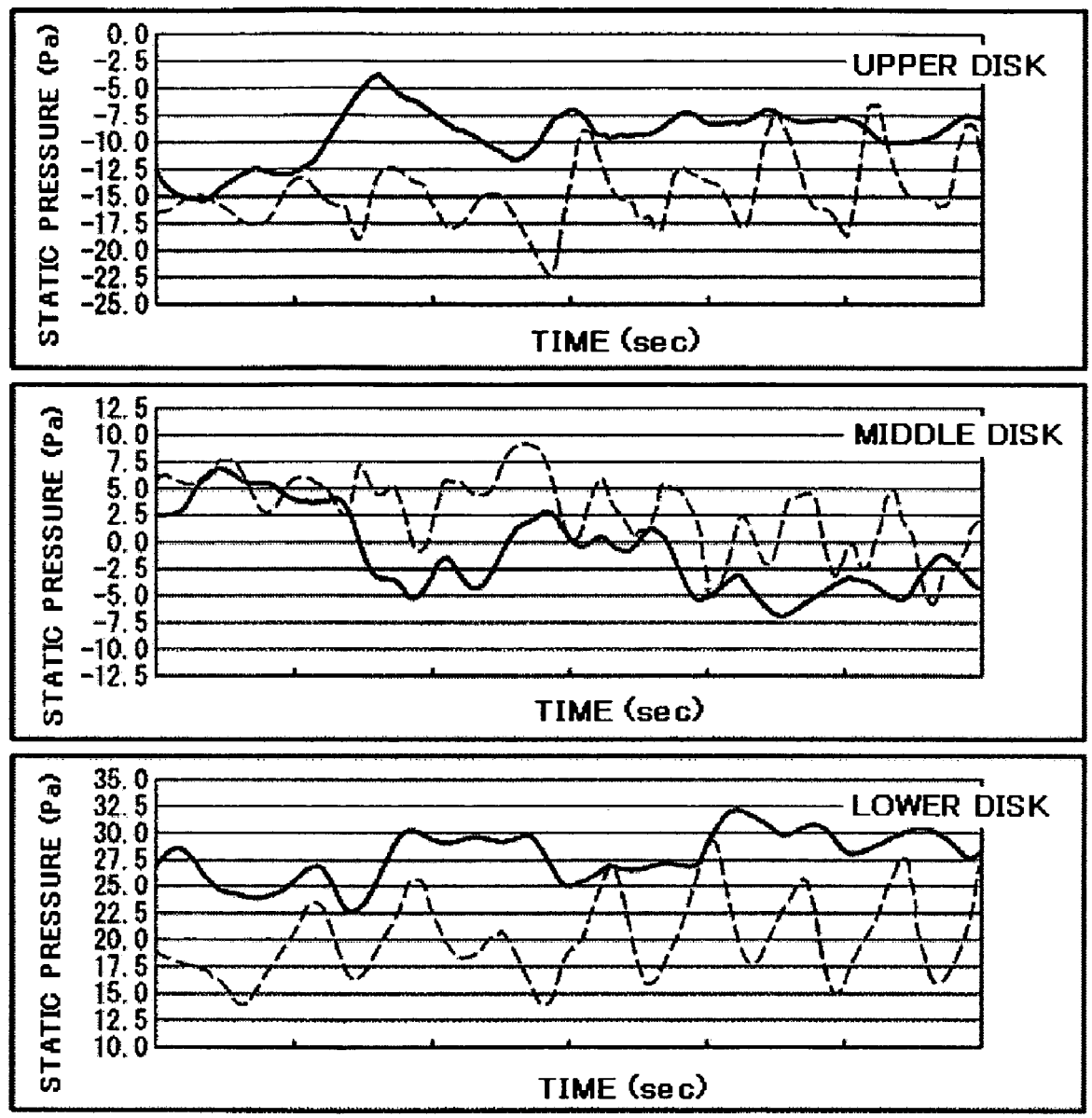
FIG. 10 is a time chart showing the difference in static pressure between top surfaces and bottom surfaces of upper, middle and lower recording disks of the magnetic disk apparatus of FIG. 9.

FIG. 10 shows the result of current analysis of the second embodiment. The analysis condition and evaluation position were the same as those in the first embodiment, and similar to FIG. 6, the difference in static pressure between the top surfaces and bottom surfaces of the upper, middle and lower recording disks 1 in the vicinity of the interval A is shown. The horizontal axis represents the time, and the vertical axis represents the difference in static pressure. The dotted lines represent an instance where the grooves 8 were not disposed in the shroud 2, and the solid lines represent an instance where two of the grooves 8 were disposed. As is apparent from the analysis result of FIG. 9, it will be understood that the amplitude of the pressure fluctuation was remarkably reduced in the upper, middle and lower recording disks by the effects of the grooves 8, and that there was an effect in reducing disk fluttering similar to the first embodiment.

Next, a third embodiment of the invention will be described using FIGS. 11 and 12. The third embodiment is different from the first embodiment in the following point, and basically the same as the first embodiment in other points.

Figure 11:
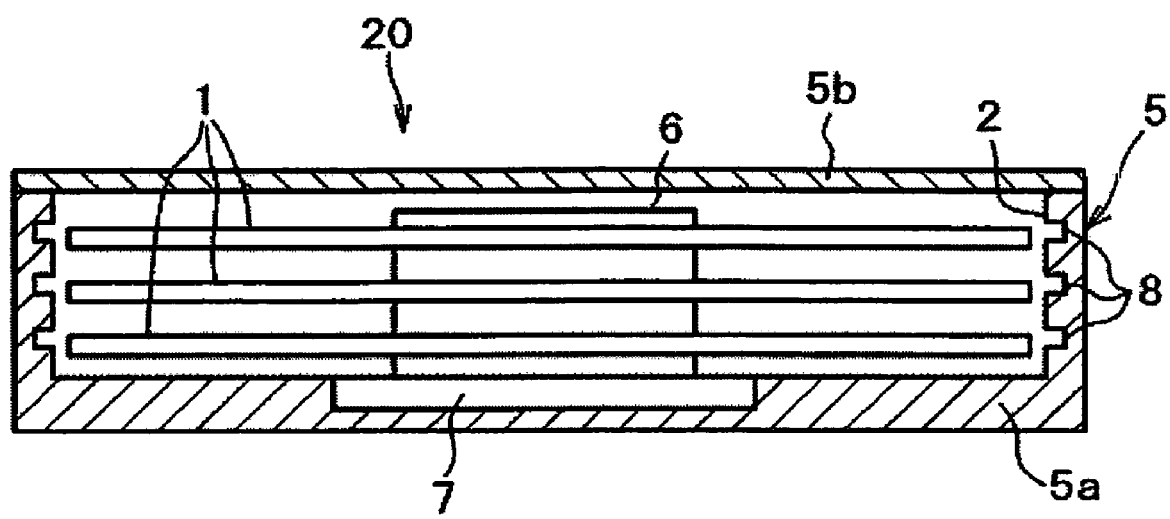
FIG. 11 is a longitudinal sectional view of a magnetic disk apparatus pertaining to a third embodiment of the invention.

FIG. 11 is a longitudinal sectional view of the magnetic disk apparatus pertaining to the third embodiment of the invention. The characteristic of the third embodiment is that there are three of the grooves 8 that are asymmetrical with respect to the top surface of each disk 1.

Figure 12:
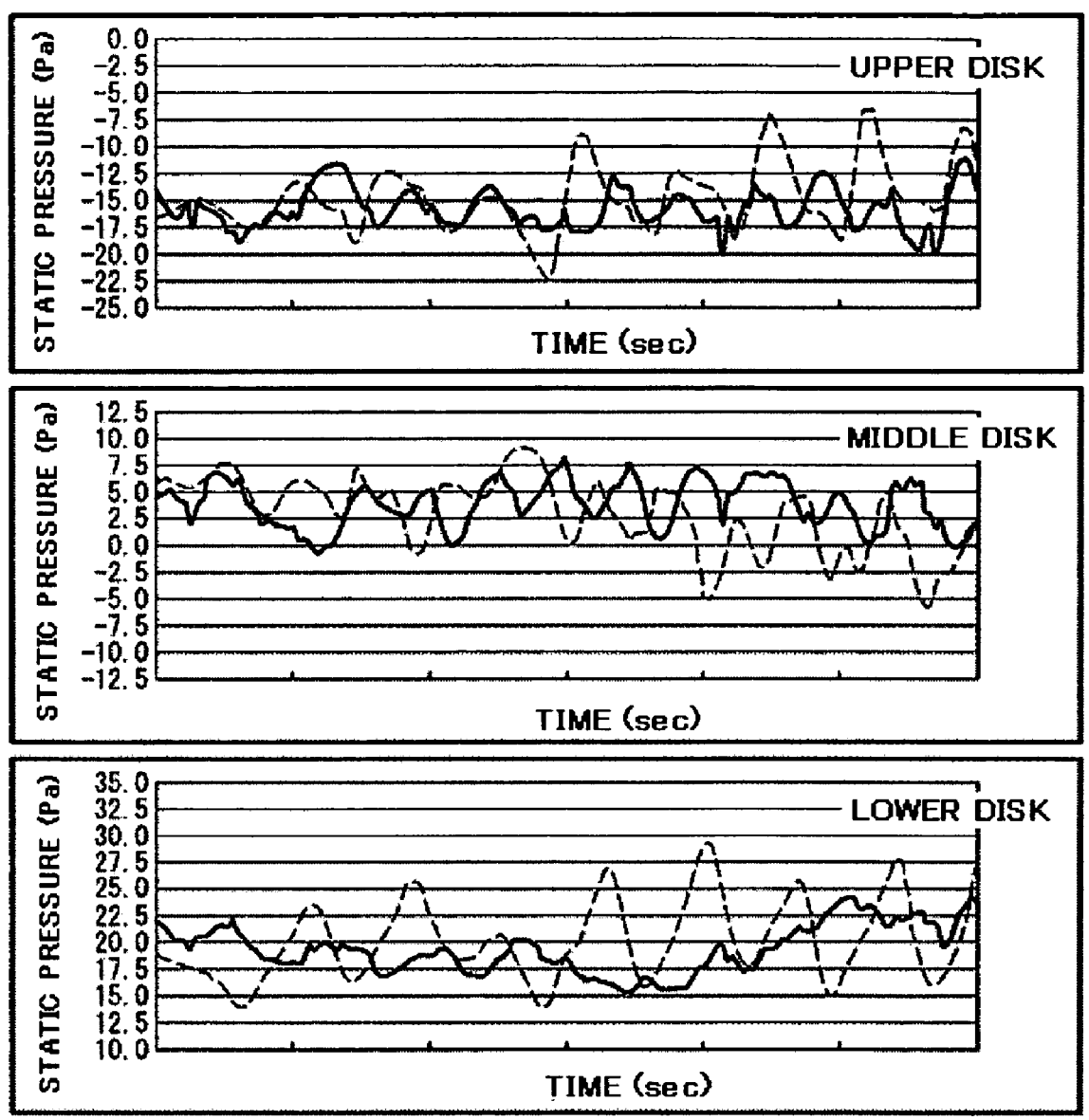
FIG. 12 is a time chart showing the difference in static pressure between top surfaces and bottom surfaces of upper, middle and lower recording disks of the magnetic disk apparatus of FIG. 11.

FIG. 12 shows the result of current analysis of the third embodiment. The analysis condition and evaluation position were the same as those in the first embodiment, and similar to FIG. 6, the difference in static pressure between the top surfaces and bottom surfaces of the upper, middle and lower recording disks 1 in the vicinity of the interval A is shown. The horizontal axis represents the time, and the vertical axis represents the difference in static pressure. The dotted lines represent an instance where the grooves 8 were not disposed in the shroud 2, and the solid lines represent an instance where three of the grooves 8 were disposed. As is apparent from the analysis result of FIG. 11, it will be understood that the amplitude of the pressure fluctuation was remarkably reduced in the upper, middle and lower recording disks by the effects of the grooves 8, and that there was an effect in reducing disk fluttering. However, in comparison to the first and second embodiments, a periodic fluctuation remained in the third embodiment, and the effect of reduction was small.

Next, fourth and fifth embodiments of the invention will be described using FIGS. 13 and 14. The fourth and fifth embodiments are different from the first embodiment in the following point, and basically the same as the first embodiment in other points.

Figure 13A:
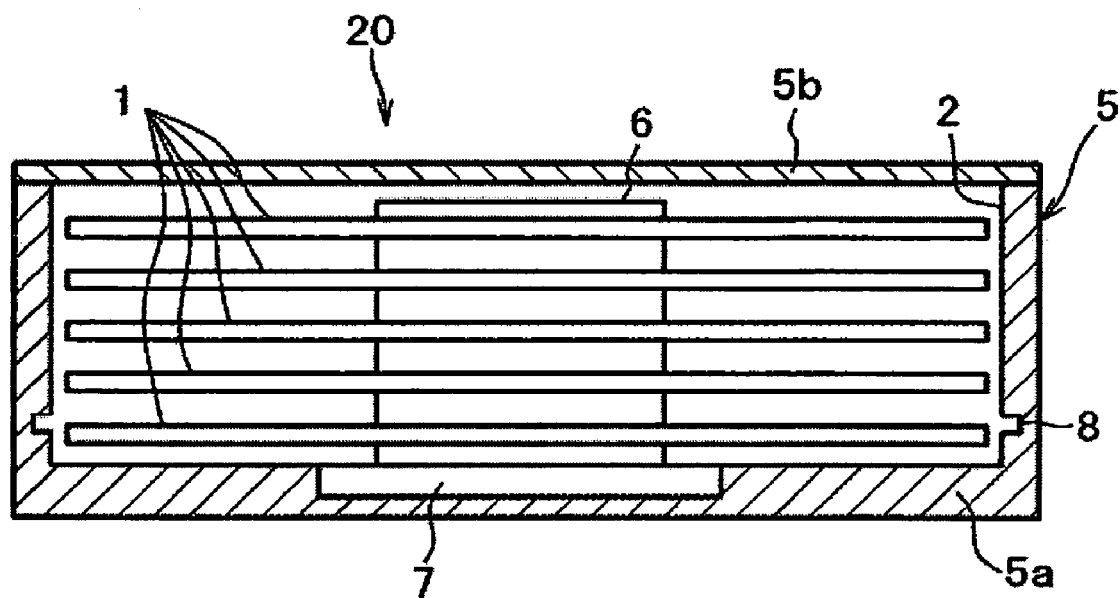
FIG. 13A is a longitudinal sectional view of a magnetic disk apparatus pertaining to a fourth embodiment of the invention.
Figure 13B:
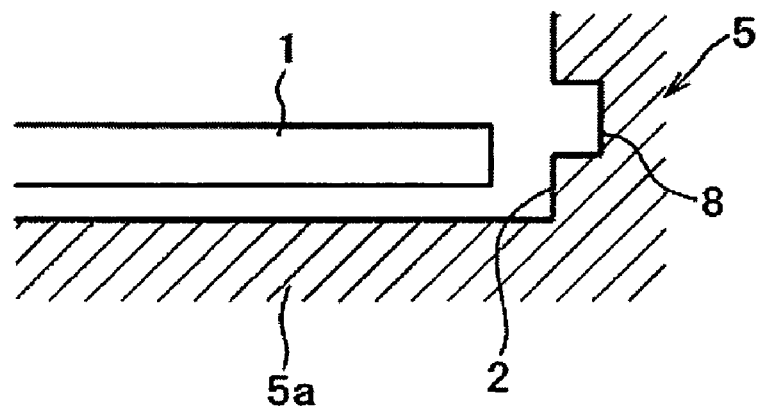
FIG. 13B is an enlarged view of relevant portions of FIG. 13A.
Figure 14A:
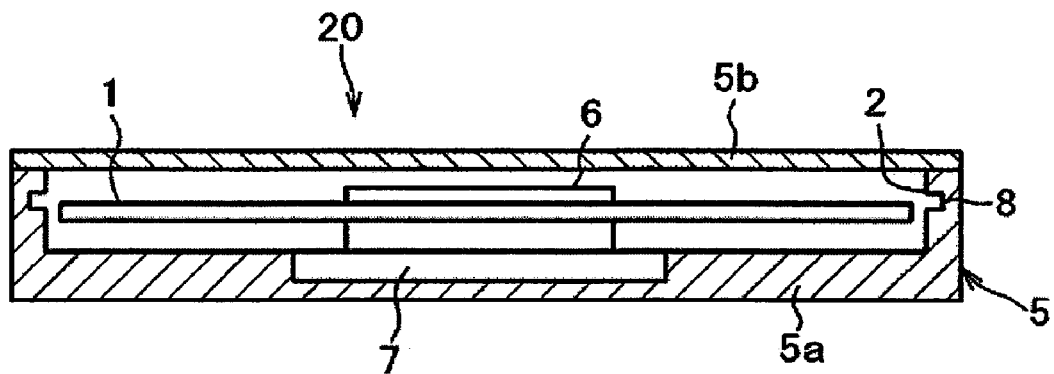
FIG. 14A is a longitudinal sectional view of a magnetic disk apparatus pertaining to a fifth embodiment of the invention.
Figure 14B:
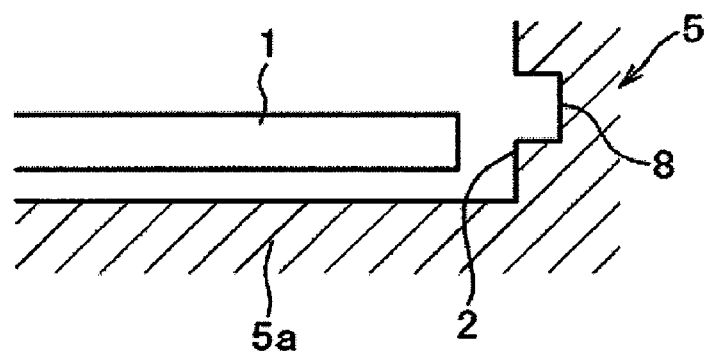
FIG. 14B is an enlarged view of relevant portions of FIG. 14A.

FIGS. 13 and 14 show examples of the groove 8 in instances where the number of recording disks 1 is different. The fourth embodiment shown in FIG. 13 is an instance where there are five recording disks 1, and represents an example where the groove 8 is formed at a position corresponding to the top surface of the lowermost disk 1. The fifth embodiment shown in FIG. 14 is an instance where there is one recording disk 1, and represents an example where the groove 8 is disposed at the top surface side of the recording disk 1. By disposing the asymmetrical groove 8 in this manner, effects that are the same as those of the first embodiment can be obtained even when the number of recording disks 1 changes.

Figure 15:
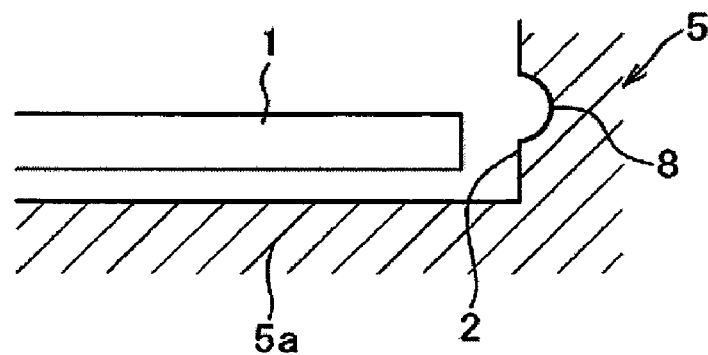
FIG. 15 is a diagram showing a semicircular groove in a magnetic disk apparatus pertaining to a sixth embodiment of the invention.
Figure 17:
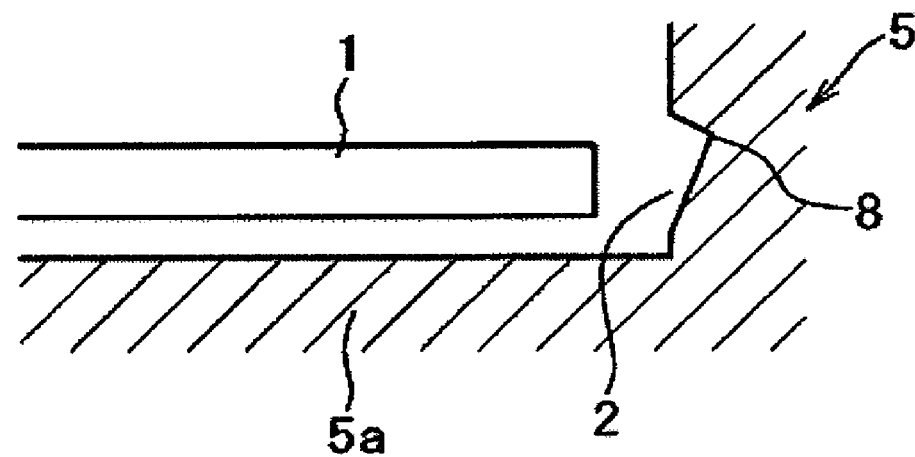
FIG. 17 is a diagram showing a triangular groove where the lengths of two sides are different in a magnetic disk apparatus pertaining to an eighth embodiment of the invention.

Next, sixth to eighth embodiments of the invention will be described using FIGS. 15 and 17. The sixth to eighth embodiments are different from the first embodiment in the following point, and basically the same as the first embodiment in other points.

Figure 16:
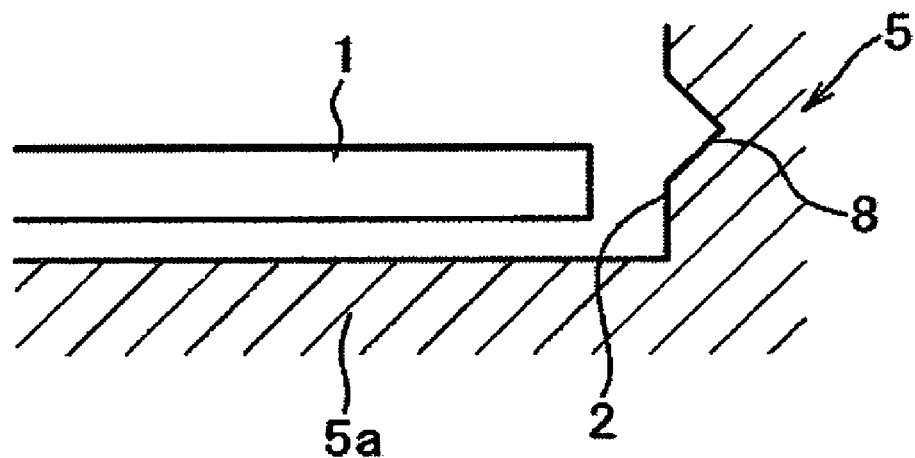
FIG. 16 is a diagram showing an isosceles triangular groove in a magnetic disk apparatus pertaining to a seventh embodiment of the invention.

The sixth to eighth embodiments are instances where the cross-sectional shape of the groove 8 is varied. FIG. 15 shows an instance where the shape is close to semicircular, FIG. 16 shows an instance where the shape is that of an isosceles triangle, and FIG. 17 shows an instance where the shape is that of a triangle whose sides are different. In all of these instances, it is possible to reduce disk fluttering by disposing the groove 8 at an asymmetrical position with respect to the recording disk.

As described in the preceding embodiments, the asymmetrical groove 8 is effective in reducing disk fluttering, disposing a groove with respect to the lowermost disk, the uppermost disk, or the uppermost and lowermost disks is more effective in reducing disk fluttering than disposing a groove with respect to each disk, and the effect is higher when the groove end portions 10 are blocked rather than open.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk apparatus comprising:
   a recording disk that is an information medium configured by one or plural disks;
   a motor causing the recording disk to rotate;
   a carriage supporting a head that records information to, or plays back information from, the recording disk;
   a casing housing the recording disk; and
   a shroud disposed surrounding an outer periphery of the recording disk,
   wherein a groove that extends along the recording disk is formed, vertically asymmetrical with respect to an outer peripheral surface of the recording disk, in the shroud surface at a position where a corner portion formed by the outer peripheral surface and a top surface or bottom surface of the recording disk extends in a radial direction
   wherein the groove is positioned so that its lower end corresponds to a center portion of the outer peripheral surface of the recording disk and its upper end corresponds to the space between the recording disks.

2. The magnetic disk apparatus of claim 1, wherein:
   a plurality of the recording disks are vertically supported, and
   the groove is disposed in the shroud surface at a position where a corner portion formed by the outer peripheral surface and a surface, opposite from the side facing the casing, of the recording disk facing a bottom wall or a top wall of the casing extends in a radial direction.

3. The magnetic disk apparatus of claim 2, wherein:
the recording disk is disposed so that the interval between the recording disk and a bottom wall of the casing and the interval between the recording disk and a top wall of the casing are different, and
the groove is disposed in the shroud surface at a position where a corner portion formed by the outer peripheral surface and a surface, opposite from the side facing the casing, of the recording disk facing the casing at the narrow interval extends in a radial direction.

4. The magnetic disk apparatus of claim 3, wherein part of the shroud is missing with respect to the entire periphery, and end portions of the groove at the missing position of the shroud are blocked in a peripheral direction.

5. The magnetic disk apparatus of claim 2, wherein the groove is positioned so that upper and lower ends thereof correspond to the outer peripheral surface of the recording disk and the space between the recording disks.

6. The magnetic disk apparatus of claim 5, wherein:
the recording disk is disposed so that the interval between the recording disk and a bottom wall of the casing and the interval between the recording disk and a top wall of the casing are different, and
the groove is disposed in the shroud surface at a position where a corner portion formed by the outer peripheral surface and a surface, opposite from the side facing the casing, of the recording disk facing the casing at the narrow interval extends in a radial direction.

7. The magnetic disk apparatus of claim 6, wherein part of the shroud is missing with respect to the entire periphery, and end portions of the groove at the missing position of the shroud are blocked in a peripheral direction.

8. The magnetic disk apparatus of claim 1, wherein:
a plurality of the recording disks are vertically supported, and
the groove is respectively disposed in
the shroud surface at a position where a corner portion formed by the outer peripheral surface and a surface, opposite from the side facing the casing, of the recording disk facing a bottom wall of the casing extends in a radial direction,
and the shroud surface at a position where a corner portion formed by the outer peripheral surface and a surface, opposite from the side facing the casing, of the recording disk facing a top wall of the casing extends in a radial direction.

9. The magnetic disk apparatus of claim 8, wherein:
the recording disk is disposed so that the interval between the recording disk and a bottom wall of the casing and the interval between the recording disk and a top wall of the casing are different, and
the groove is disposed in the shroud surface at a position where a corner portion formed by the outer peripheral surface and a surface, opposite from the side facing the casing, of the recording disk facing the casing at the narrow interval extends in a radial direction.

10. The magnetic disk apparatus of claim 9, wherein part of the shroud is missing with respect to the entire periphery, and end portions of the groove at the missing position of the shroud are blocked in a peripheral direction.

11. The magnetic disk apparatus of claim 1, wherein:
the recording disk is disposed so that the interval between the recording disk and a bottom wall of the casing and the interval between the recording disk and a top wall of the casing are different, and
the groove is disposed in the shroud surface at a position where a corner portion formed by the outer peripheral surface and a surface, opposite from the side facing the casing, of the recording disk facing the casing at the narrow interval extends in a radial direction.

12. The magnetic disk apparatus of claim 11, wherein:
the recording disks are configured by numerous disks disposed at equal intervals, and
only one groove is disposed in the shroud surface at a position where a corner portion formed by the outer peripheral surface and a surface, opposite from the side facing the casing, of the recording disk facing the bottom wall or top wall of the casing extends in a radial direction.

13. The magnetic disk apparatus of claim 12, wherein part of the shroud is missing with respect to the entire periphery, and end portions of the groove at the missing position of the shroud are blocked in a peripheral direction.

14. The magnetic disk apparatus of claim 1, wherein:
the recording disk is disposed so that the interval between the recording disk and a bottom wall of the casing and the interval between the recording disk and a top wall of the casing are different, and
the groove is disposed in the shroud surface at a position where a corner portion formed by the outer peripheral surface and a surface, opposite from the side facing the casing, of the recording disk facing the casing at the narrow interval extends in a radial direction.

15. The magnetic disk apparatus of claim 14, wherein part of the shroud is missing with respect to the entire periphery, and end portions of the groove at the missing position of the shroud are blocked in a peripheral direction.

16. The magnetic disk apparatus of claim 1, wherein part of the shroud is missing with respect to the entire periphery, and end portions of the groove at the missing position of the shroud are blocked in a peripheral direction.

17. A magnetic disk apparatus comprising:
a recording disk that is an information medium configured by plural disks vertically;
a motor causing the recording disk to rotate;
a carriage supporting a head that records information to, or plays back information from, the recording disk;
a casing housing the recording disk; and
a shroud disposed surrounding an outer periphery of the recording disk, with part of the shroud being missing with respect to the entire periphery, wherein
a groove is disposed in the shroud surface at a position where a corner portion formed by the outer peripheral surface and a top surface or bottom surface of the recording disk extends in a radial direction,
the recording disk is disposed so that the interval between the recording disk and a bottom wall of the casing and the interval between the recording disk and a top wall of the casing are different, and
only one groove is disposed in the shroud surface at a position where a corner portion formed by the outer peripheral surface and a surface, opposite from the side facing the casing, of the recording disk configuring the narrow interval extends in a radial direction, and the groove is disposed vertically facing part of the outer peripheral surface of the recording disk and extending facing the space between the recording disks, with end portions of the groove at the missing position of the shroud being blocked in a peripheral direction.

* * * * *